(12) United States Patent
Factor et al.

(10) Patent No.: US 7,548,896 B2
(45) Date of Patent: Jun. 16, 2009

(54) DEVICE, METHOD AND COMPUTER PROGRAM READABLE MEDIUM FOR SUPPORT OF MAINTAINING A SYSTEM

(75) Inventors: Michael E. Factor, Haifa (IL); Shlomit Sarah Pinter, Haifa (IL); Aviad Zlotnick, D.N.Galil Tachton (IL)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/390,127

(22) Filed: Mar. 27, 2006

(65) Prior Publication Data

US 2007/0226161 A1 Sep. 27, 2007

(51) Int. Cl.
*G06N 5/02* (2006.01)
*G06N 7/04* (2006.01)
(52) U.S. Cl. .......................................... 706/47; 706/46
(58) Field of Classification Search .................. None
See application file for complete search history.

(56) References Cited

U.S. PATENT DOCUMENTS

| | | | | |
|---|---|---|---|---|
| 5,911,041 | A * | 6/1999 | Schaffer | 714/38 |
| 6,857,115 | B1 * | 2/2005 | Dasasathyan et al. | 716/9 |
| 6,904,410 | B1 | 6/2005 | Weiss et al. | |
| 7,089,526 | B1 * | 8/2006 | Salowe et al. | 716/14 |
| 7,143,380 | B1 * | 11/2006 | Anderson et al. | 716/10 |
| 2003/0056145 | A1 | 3/2003 | Kuth | |
| 2003/0130755 | A1 | 7/2003 | Bazzocchi et al. | |
| 2003/0227877 | A1 * | 12/2003 | Kar et al. | 370/252 |
| 2005/0209841 | A1 | 9/2005 | Arning et al. | |
| 2005/0273341 | A1 * | 12/2005 | Hoffesommer | 705/1 |

FOREIGN PATENT DOCUMENTS

| | | |
|---|---|---|
| EP | 0633528 | 6/1994 |
| EP | 0810558 | 5/1997 |
| JP | 2001092738 | 9/1999 |
| JP | 2002032880 | 7/2000 |
| JP | 2002133228 | 10/2000 |
| JP | 2002163390 | 11/2000 |
| JP | 2004328562 | 4/2002 |
| JP | 2004021583 | 6/2002 |
| JP | 2003058652 | 2/2003 |

* cited by examiner

*Primary Examiner*—David R Vincent
*Assistant Examiner*—Adrian L Kennedy

(57) ABSTRACT

Method, device and computer program product for support of maintaining a system. The method includes: evaluating a current system state and detecting a first lattice element corresponding to the current system state; locating at least one state improvement path, within a lattice that represents states of the system, between the first lattice element and a second lattice element representative of a target system state; determining, for at least one state improvement path, rules that should be satisfied in order to reach the system target state; and determining how to fulfill the rules associated with at least one state improvement path.

14 Claims, 8 Drawing Sheets

100

DEVICE, METHOD AND COMPUTER PROGRAM READABLE MEDIUM FOR SUPPORT OF MAINTAINING A SYSTEM

FIELD OF THE INVENTION

The present invention relates to methods, devices and computer program products for support of maintaining a system.

BACKGROUND OF THE INVENTION

Repair under warranty is a significant factor in system cost. Reducing it can improve profitability and competitiveness. One of the main price factors is the cost of sending an engineer to the site where the repair must be executed.

Some prior art customer service systems alert the customer of the needed repairs by indicating the faulty part. These prior art customer service systems do not suggest the optimal way to perform the repair and do not indicate the repair urgency.

There is a need to provide methods, systems and computer readable products that can simplify/optimize system maintenance.

SUMMARY OF THE PRESENT INVENTION

Method, device and computer program product for support of maintaining a system, the method includes: evaluating a current system state and detecting a first lattice element corresponding to the current system state; locating at least one state improvement path, within a lattice that represents states of the system, between the first lattice element and a second lattice element representative of a target system state; determining, for at least one state improvement path, rules that should be satisfied in order to reach the system target state; and determining how to fulfill the rules associated with at least one state improvement path.

Conveniently, the evaluating includes applying at least one flow algorithm on a flow graph representative of the system and rules imposed on the system.

Conveniently, the evaluating includes defining capacities of edges of the flow graph in response to the rules, determining a flow through the edges by applying a flow algorithm; wherein a flow that passes through at least some edges of the flow graph correspond to a connection between a replaceable object and a slot.

Conveniently, evaluating includes applying at least one flow algorithm on a flow graph representative of the system, of rules imposed on the system and of replaceable objects that do not belong to the system.

Conveniently, the method includes selecting system slots and replaceable objects that can be inserted in the slots in response to rules and in response to characteristics of slots and replaceable objects.

Conveniently, the determining how to fulfill the rules includes selecting at least one replaceable object that does not belong to the system.

Conveniently, the determining how to fulfill the rules includes selecting at least one replaceable object that belongs to another system.

Conveniently, the method includes performing at least one operation so as to satisfy the rules.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
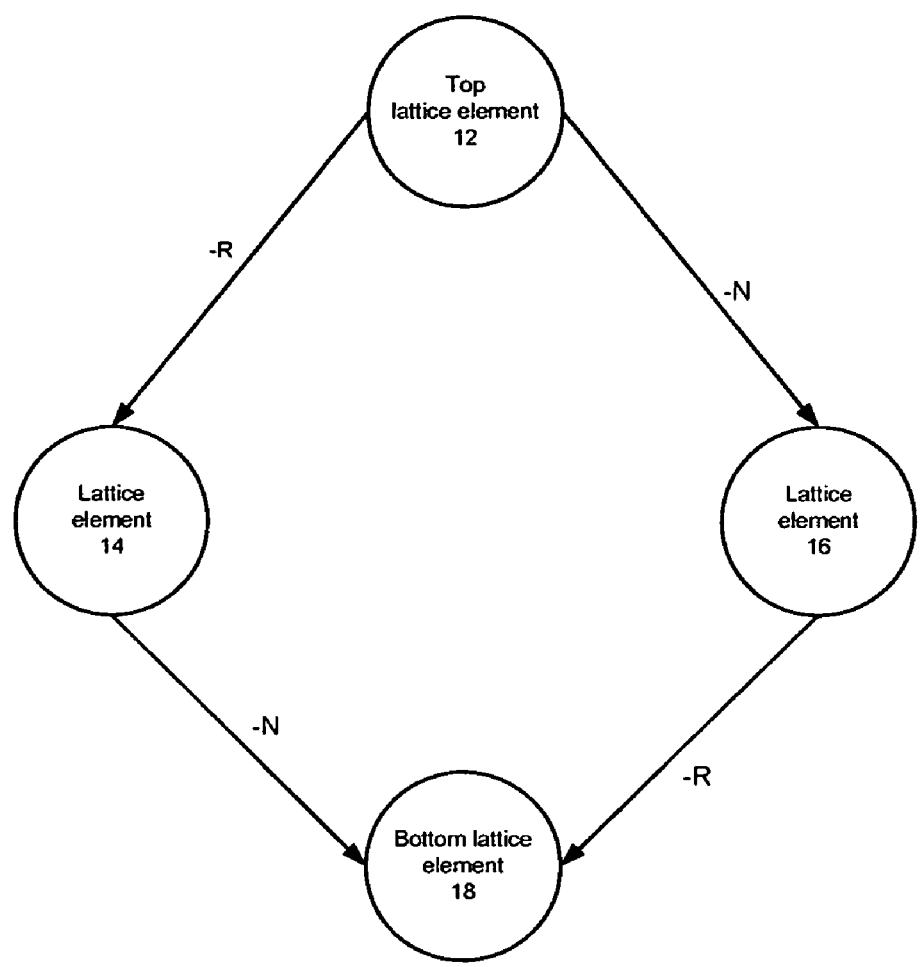
FIG. 1 illustrates a lattice according to an embodiment of the invention.

Methods, devices and computer program products are provided. According to an embodiment of the invention the devices, methods and computer program products enable to maintain a system.

The invention provides a method, device and a computer readable code that can receive notification of some identified problem in a system, evaluate the state of the system, select a target system state, find which rules, requirements and/or specifications (collectively referred to as rules) should be satisfied in order to bring the system to the target system state, and find a way to bring the system to the target system state. This way can be the optimal way, it can require receiving objects (also referred to as components or parts) from one or more other systems or places, can be responsive to the cost of replacement, to the risks involved in maintaining the system at its current state and the like.

At any given moment the system can be at certain state out of a group of states. Each state is represented by a lattice element. The lattice elements represent a partial order between the states. The group can include all possible states or a subset of the possible states of the system. The states that are included in the group of states can be defined by a user. Conveniently, the partial order reflects a satisfaction level (also referred to as "goodness") from the system.

According to one embodiment of the invention, each lattice element is characterized by the rules that are satisfied when the system is at the state represented by that lattice element. The lattice elements are connected by paths that represent the rules that should be satisfied (when moving upwards) or rules that are not satisfied (when moving downwards) in order to move from one state to another.

Conveniently, the current state of the system is defined by representing the system as well as the rules that should be satisfied by the system with a graph (also referred to as extended auxiliary flow graph or network) and applying network flow algorithms in order to determine which rules are satisfied and which are not. Conveniently, by finding cuts and especially finding minimal cuts in the network, the state of the system can be detected.

The system can include various objects (also referred to as components or parts). These objects can include replaceable objects (including customer replaceable units—CRUs), elements that are reported in error messages (e.g., hint PCI bridge), non-replaceable objects that interact with replaceable units such as slots (that can be by-passed, failed, occupied etc.), and non-replaceable objects that are not slots (e.g., processor, FC-switch, a part of the processor, a part of the FC-switch). For convenience of explanation most of the following description relate to CRUs although CRUs are only an example of replaceable objects.

Each object can be characterized by various characteristics including its location, its identity, its health (functionality) and the like. The possible states of an object depend on the type of the object. Various object states can include: the object is operative, the object should be initialized, the object should be activated, the object should be configured, the object is not connected to the system but is available, the object is not functional, and the like. The state of the object can be altered by performing various operations such as installing the object, repairing the object, initializing the object, configuring the object and the like.

Conveniently an object that belongs to another system can be used to replace a faulty or non-existing object of the maintained system.

The state of a system that includes multiple objects is responsive to the state of the objects as well as to the relationship between the objects and the rules. The system state is defined in response to a compliance (or non-compliance) with various rules. These rules can include maintenance rules, functionality rules, or configuration rules that define the required states of the objects that form the group as well as the required relationship between the objects of the group.

Some of the rules can be defined by a user. For example, the user may request to work with two surplus hard disks or can tolerate only one backup battery.

The rules can relate to the logical or physical configuration of the system.

Some of the rules can be mandatory (also referred to as necessary rules) and must be fulfilled before the system can continue its operation. Others can be used to define the optimal required mode of operation. These other rules can be regarded as redundant rules.

Assuming that a system includes multiple objects such as slots and CRUs, the rules can, for example, reflect the required CRUs that should be placed in one or more slots, the position of the CRUs within the slots, the number of functional CRUs that should be connected to certain slots in order to enable the system (or a certain function of the system) to operate.

A certain rule can define the configuration of multiple CRUs while other rules can define the configuration of a single CRU. Rules can include physical rules that define the physical configuration of objects of the system. Rules can include logical rules.

Rules may relate to levels of stock, roles of objects, requirements on the required objects, failure status, logical configuration needs, rules derived from performance observations, etc.

Rules can also define the capability of transferring an object from one system to another.

FIG. 1 illustrates a lattice 10, according to an embodiment of the invention. Lattice 10 includes four lattice elements 12, 14 16 and 18 corresponding to four states of the system.

Lattice element 12 is the top element (also referred to as join or supremum) of lattice 10. Lattice element 18 is the bottom element (also referred to as meet or infimum) of lattice 10. Lattice elements 14 and 16 are positioned between lattice elements 12 and 18.

Lattice 10 illustrates a group of states that include four system states. Each state differs from each other by the fulfillment of a mandatory rule N and a redundant rule R. It is noted that all these states can represent systems that satisfy additional rules that are not illustrated for convenience of illustration.

Lattice element 12 represents a state in which both rules R and N are satisfied. Lattice element 18 represents a state in which both rules (R and N) are not satisfied. Lattice element 14 represents a state in which the mandatory rule is satisfied but the redundant rule is not satisfied. Lattice element 16 represents a state in which the mandatory rule is not satisfied and the redundant rule is satisfied.

The paths between each lattice element to the other indicate the rules that are satisfied by one state but not by the other state. Accordingly, the path between top lattice element 12 and lattice element 14 is marked with –R, the path between top lattice element 12 and lattice element 16 is marked with –N, the path between lattice element 14 and bottom lattice element 18 is marked with –N, and the path between lattice element 16 and bottom lattice element 18 is marked with –R.

Thus, if the system is at a state that corresponds to bottom lattice element 18 and the user defines the system target state as corresponding with lattice element 14 then rule N should be satisfied. On the other hand if the system target state corresponds to lattice element 12 then both rules N and R should be satisfied.

It is noted that the order (location) of lattice elements in the lattice corresponds to the quality of (also referred to "goodness of" or "satisfaction from") the states representative by the lattice elements. Typically, the top lattice element represents the best state of the system out of the group of states.

According to an embodiment of the invention a current state of the system is defined and if it differs from the system target state the paths of the lattice are followed to determine which rules should be satisfied.

Conveniently, an evaluation of the current state of the system is triggered by a triggering event. A triggering event indicates that the state of the system or at least one of its components changed. A triggering event can include a failure of an object, a maintenance operation, a removal of an object and the like.

Figure 2:
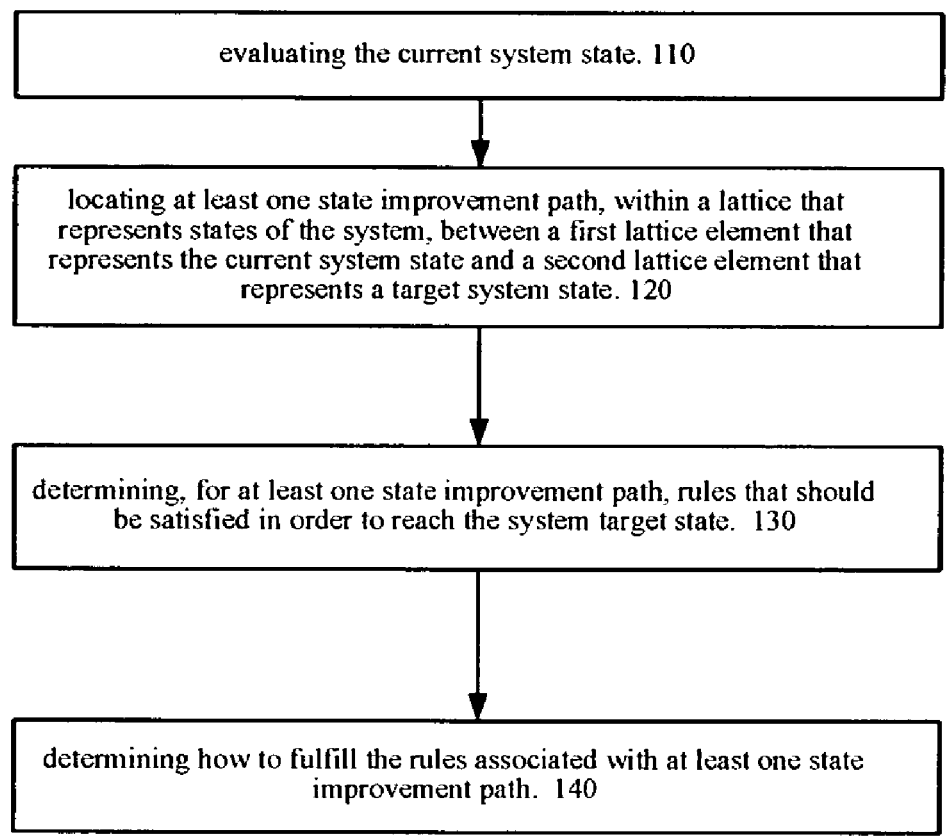
FIG. 2 illustrates a method for support of maintaining a system according to an embodiment of the invention.

FIG. 2 illustrates a method 100 for support of maintaining a system, according to an embodiment of the invention.

Method 100 starts by stage 110 of evaluating the current system state. Given the operational CRUs and slots, and the satisfied rules, the lattice element corresponding to the current system state is detected.

Stage 110 is followed by stage 120 of locating at least one state improvement path, within a lattice that represents states of the system, between a first lattice element representative of the current system state and a second lattice element that represents the target system state. It is noted that more than a single state improvement path can be located.

Stage 120 is followed by stage 130 of determining, for at least one state improvement path, rules that should be satisfied in order to reach the system target state.

Stage 130 is followed by stage 140 of determining how to fulfill the rules associated with at least one state improvement path. Stage 140 can be followed by a stage of performing at least one operation such as to satisfy the rules.

The determination can be responsive to the cost of at least one rule fulfillment measure. The determination can also be responsive to the risk imposed by maintaining the system at its current state as well as risks imposed by improving the state of the system. The latter can be relevant if a rule fulfillment measure involves removing an object from another system.

The risk can be assessed in response to the distance (for example, number of elements) between the lattice element representative of the current state of the system and one or more lattice elements that represent a system failure. The system failure can include a full-scale shut down, a partial shut-down, and the like.

Conveniently, stages 110 as well as stage 140 involve applying flow algorithms in order to evaluate the state of the system and especially examining flow graphs that represent the system and rules imposed on the system. The following figures illustrate how to generate such flow graphs and how to process such a diagram.

Figure 3:
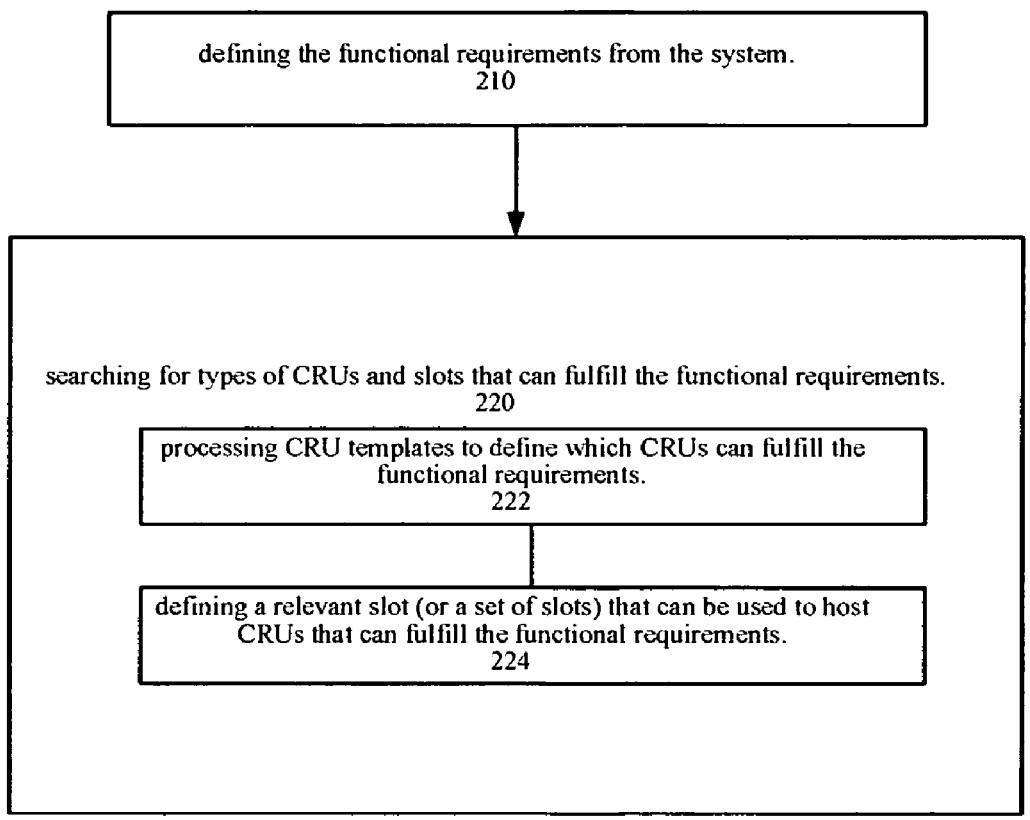
FIG. 3 illustrates a method for defining rules according to an embodiment of the invention.

FIG. 3 illustrates a method 200 for defining rules, according to an embodiment of the invention.

As mentioned above a state of a system is responsive to the rules that are fulfilled by that system. The rules can be defined by a user, by a system administrator and the like. A rule can be defined for each function that the system is required to perform, but this is not necessarily so.

Figure 4:
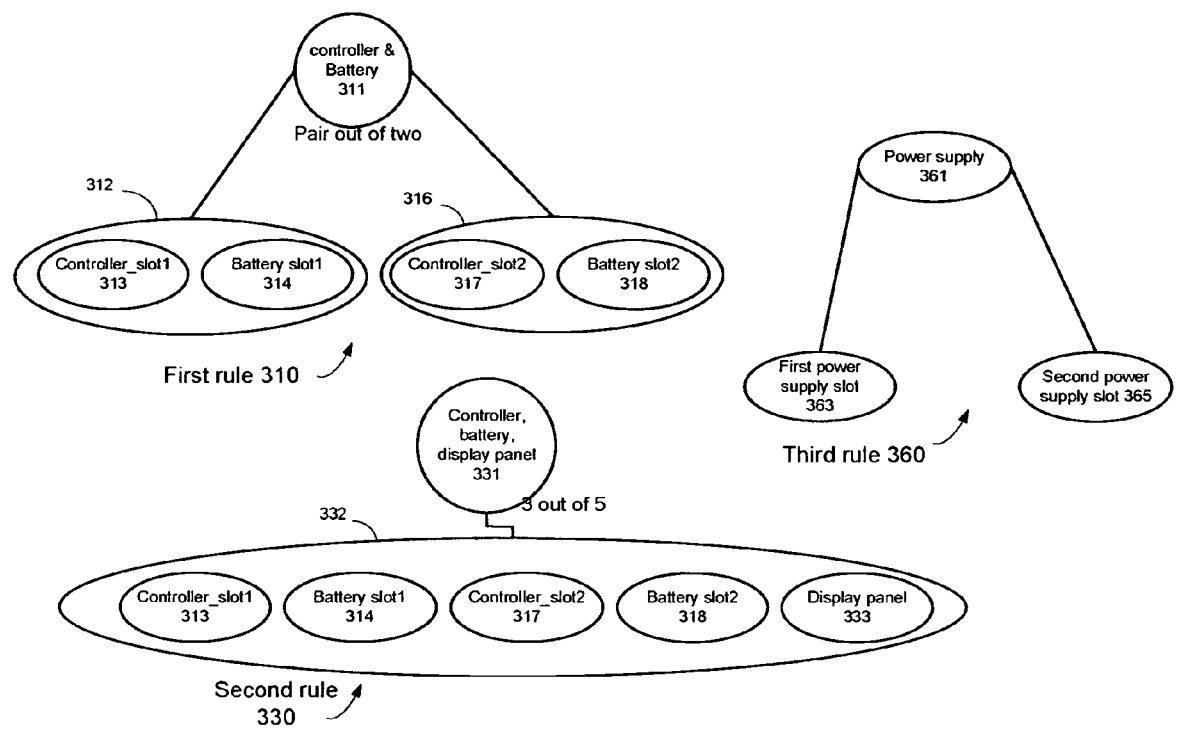
FIG. 4 illustrates a bi-partite graph that illustrates three exemplary rules according to an embodiment of the invention.

A rule defines a relationship between various elements. The elements are arranged in multiple levels. The inventors used a triple-layer element structure in which the lowest layer elements includes CRUs, the intermediate layer includes slots and the upper layer includes required elements. Required elements represent elements or elements groups that should function in order to satisfy a requirement (usually a functional requirement) from the system. It is noted that other multi-layered representations can be used. For example, the number of layers can exceed three (for example a fourth layer can represent virtual or logical elements), the components (especially the required elements) can be logical as well as physical components. A component can include hardware, software, firmware or a combination thereof. As illustrated in FIG. 4 a certain component can appear in multiple rules.

Method 200 starts by stage 210 of defining the functional requirements from the system. This definition can be made by various persons, and in various manners, it can be done manually or automatically. This definition can be updated, but such an update can result in altering one or more rules.

Stage 210 is followed by stage 220 of searching for type of CRUs and slots that can fulfill the functional requirements. The CRUs as well as the slots can have certain characteristics. These characteristics (for example, transmission speed of a CRU, storage capacity and the like) are processed to define which slot can be used to fulfill a functional requirement, and which CRU can fulfill a functional requirement.

For example, if a certain functional requirement of the system can be fulfilled by one or more fast DDMs then one of those DDM characteristics is its speed.

Stage 220 may include stages 222 and 224. Stage 222 includes processing CRU templates to define which CRUs can fulfill the functional requirements. A CRU template can define one or more CRU characteristic.

Stage 222 is followed by stage 224 of defining a relevant slot (or a set of slots) that can be used to host CRUs that can fulfill the functional requirements. The result of stage 224 can be one or more slots (such as a top controller slot, left battery slot, DDM (Disk Drive Module) slot that has a special interface rate) that can host CRUS.

Stage 224 can include specifying target slots based on one or more slot characteristics such as their type and place.

A typical result of stage 224 can be one or more sets of slots, wherein a typical rule defines an "n-of" relationship between the slots and CRUs inserted within these slots. An "n-of" rule indicates that at least a subset of elements (n) out of a set of elements (that includes n or more elements) should function in order to fulfill the rule.

FIG. 4 illustrates a bi-partite graph that illustrates three exemplary rules 310, 330 and 360, according to an embodiment of the invention.

The first rule 310 is represented by a first required element (denoted "Controller & battery") 311 that is linked by two edges to two pairs of slots 312 and 316. The first pair of slots 312 includes slot 313 ("controller_slot1") and slot 314 ("battery_slot1"). The second pair of slots 316 includes slot 317 ("controller_slot2") and slot 318 ("battery_slot2").

First rule 310 is fulfilled if either one of the slot pairs 312 or 316 is occupied by a functional battery and a functional Controller controller. The battery and the controller are CRUs.

Second rule 330 is represented by a second required element (denoted "Controller, battery, display panel") 331 that is linked by a single edge to a slot set 332 that includes the following five slots: 313, 314, 317, 318 and slot 333 ("Dslot"). In order to fulfill the second rule 330 at least three out of five slots should be occupied by functional CRUs. The second rule 330 is a three out of five rule.

Third rule 360 is represented by a third required element (denoted "power supply") 361 that is linked by two edges to first power supply slot 363 and to a second power supply slot 365. The third rule 360 is fulfilled if at least one out of slots 363 and 365 is occupied by a functional CRU.

The bi-partite rules illustrate a system that includes slots 313, 314, 317, 318, 333, 363 and 365. This system can also include additional objects that are not shown for simplicity of explanation.

FIG. 4 does not illustrate the relationship between the slots of a system to the CRUs that occupy these slots. CRUs that can occupy these slots (also referred to as candidate CRUs) can belong to the system, can belong to another system, can be a part of a CRUs stock and the like. The relationships between the slots and the CRU is further illustrated in FIG. 5

Figure 5:
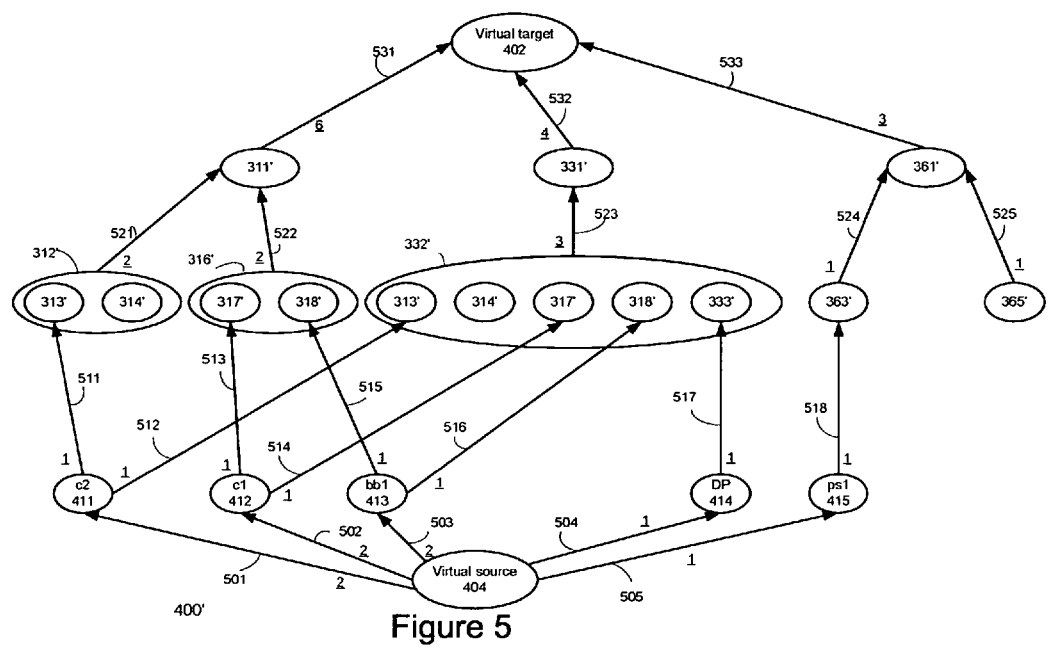
FIG. 5 illustrates a flow graph that represents a system, according to an embodiment of the invention.

FIG. 5 illustrates a flow graph 400' that represents a system, according to an embodiment of the invention.

A flow graph is a graph that can be evaluated by applying flow algorithms, such as find maximal flow algorithm, locating a minimal cut algorithm and the like. Flow algorithms are known in the art and do not require detailed explanations.

Flow graph 400' includes a virtual target 402, a virtual source 404, three required element vertexes 311', 331' and 361' that represent required elements 311, 331 and 361 accordingly, seven slot vertexes 313', 314', 317', 318', 333', 363' and 365' that represent slots 313, 314, 318, 319, 333, 363 and 365 accordingly, three slot set vertexes 312' 316' and 332' that represent slot sets 312, 316 and 332 accordingly, as well as multiple CRU vertexes 411-415 that represent CRUs. Each slot vertex out of 363' and 365' can be viewed as a slot set vertex that includes a single slot.

Three edges connect the three required element vertexes 311', 331' and 361' to the virtual target 402. Five edges connect between virtual source 404 to the five CRU vertexes 411-415. The five CRU vertexes include a first CRU vertex ("C2") 411, a second CRU vertex ("C1") 412, a third CRU vertex ("bb1") 413, a fourth CRU vertex ("DP") 414 and a fifth CRU vertex ("ps1") 415.

If a CRU can be placed in a certain slot the flow graph includes an edge that connects between the corresponding CRU vertex and the corresponding slot vertex. Because a single slot can fulfill more than a single rule then multiple edges can be connected to a single CRU vertex.

First level edges 501-505 (also referred to as target—CRU edges) connect the virtual source 404 to the five CRU vertexes 411-415. Second level edges 511-518 (also referred to as CRU—slot edges) connect between CRU vertexes 411-415 and between slot vertexes 313', 317', 318', 333' and 363'. Third level edges 521-525 (also referred to as slot set—required element edges) connect between slot set vertexes 312', 316', 332', 363' and 365' and between required element vertexes 311', 331' and 361'. Fourth level edges 531-533 (also referred to as required element—virtual target edges) connect between required element vertexes 311', 331' and 361' and the virtual target 402.

Each edge is characterized by its capacity and its flow. A maximal flow through an edge occurs when the flow equals the capacity.

The capacity of each CRU—slot edge is responsive to the rules and to the physical relationships between the slots and the CRUs. A single CRU can be inserted into a single slot. Thus, the capacity of each CRU—slot edge is one. The capacity of each slot set—required element edge is responsive to the rule. For example, if the second rule is satisfied if three operative CRUs are placed in three slots out of slot set 332' then the capacity of edge 523 (connecting slot set vertex 332' to the second required element vertex 331') is three.

The capacity of a required element—virtual target edge must be greater than the sum of the capacities of the slot set—required element edges that are connected to that required element vertex.

The capacities of the target—CRU edges are determined in view of the capacities of the CRU—slot edges. Conveniently, the capacity of a target—CRU edge that enters a certain CRU is equal to the capacity of the CRU—slot edge that exits that CRU.

In order to determine the flow, and especially the maximal flow that can flow through each edge a maximum flow algorithm is applied. The input to this algorithm is an intermediate (or auxiliary) flow graph 400' that does not include the flows of each edge (flow is initially zero on every edge). The auxiliary flow graph 400' is illustrated in FIG. 5.

Figure 7:
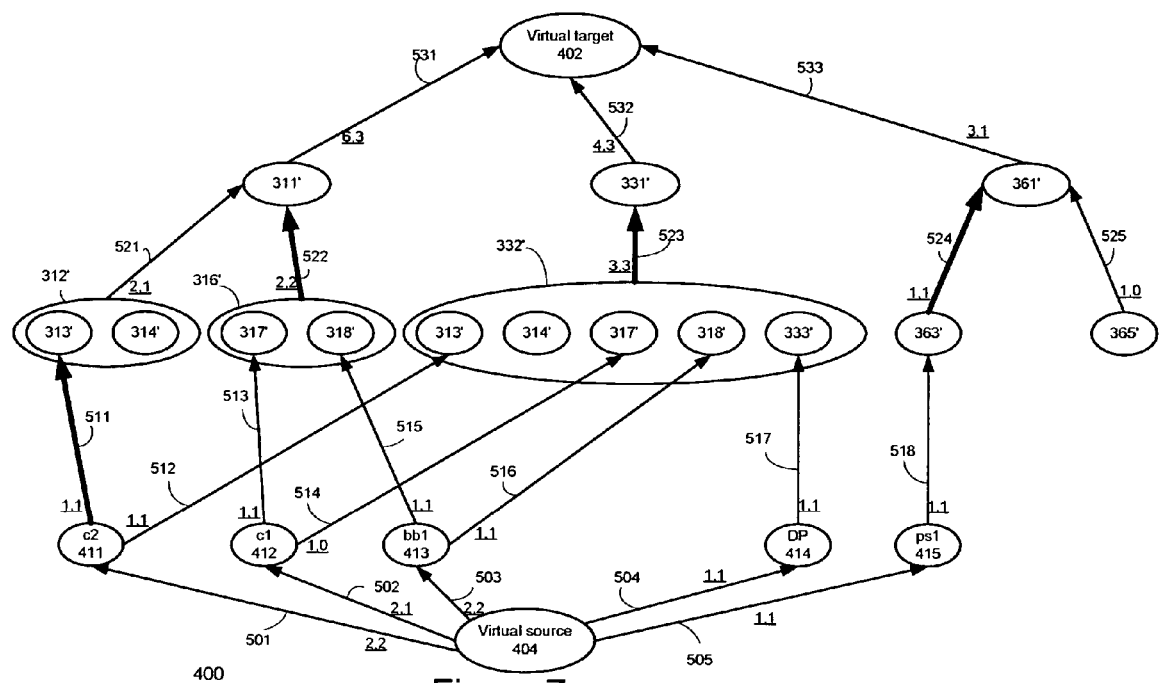
FIGS. 7 and 8 illustrate flow graphs according to various embodiments of the invention.

The output of the maximum algorithm is flow graph 400 in FIG. 7. Each edge of flow graph 400 has a flow (possible zero). The flow of each edge is limited by the capacity of that edge. The flow of a slot set—required element edge that is connected to a certain slot set vertex is responsive to the capacity of that edge and to the aggregate flow of CRU—slot edges that are connected to that slot set.

For example, in order to fulfill second rule 330 three slots out of five slots of slot set 332 should include functional CRUs. Accordingly, the capacity of the slot set—required element 523 is three and its flow cannot exceed three. There are four possible CRUs that can be inserted into the slots of slot set 332'. Because the capacity of the slot set—required element 523 is three then the flow of only three out of the CRU—slot edges can be one. The selection of three CRU—slots edges out of four CRU—slot edges can be made in various manners. It can be responsive to the order of the edge, can be done randomly, and the like.

According to an embodiment of the invention the edges (or at least some of the edges) are also associated with a cost. Thus, the selection between edges, as well as the flow that passes through each edge can be responsive to that cost.

A cost of a CRU—slot edge can be responsive to whether the CRU is already inserted in the slot, whether the CRU is in a CRU stock, whether the CRU is a redundant CRU of another system, whether the CRU is a non-redundant CRU of that other system, and the like.

According to an embodiment of the invention the cost (also referred to as price) of a CRU—slot edge is the lowest (for example zero) if the CRU is already inserted in the slot, the cost is higher (for example one) if the CRU is in a CRU stock, the cost is even higher (for example two) if the CRU is a redundant CRU of another system, and the cost is much higher than two if that CRU is a non-redundant CRU of that other system, and the like.

It is noted that other costs can be provided. For example, the cost of a certain redundant CRU within a certain system can differ from the cost of another redundant CRU of a further system.

According to an embodiment of the invention the cost is also responsive to the risk in maintaining a system in a certain state and is especially responsive to the possibility of system failure.

According to an embodiment of the invention if multiple CRUs can be placed in a single slot the cost of each scenario can be determined, and the lowest cost scenario can provide the optimal way to bring a system to its target state.

Figure 6:
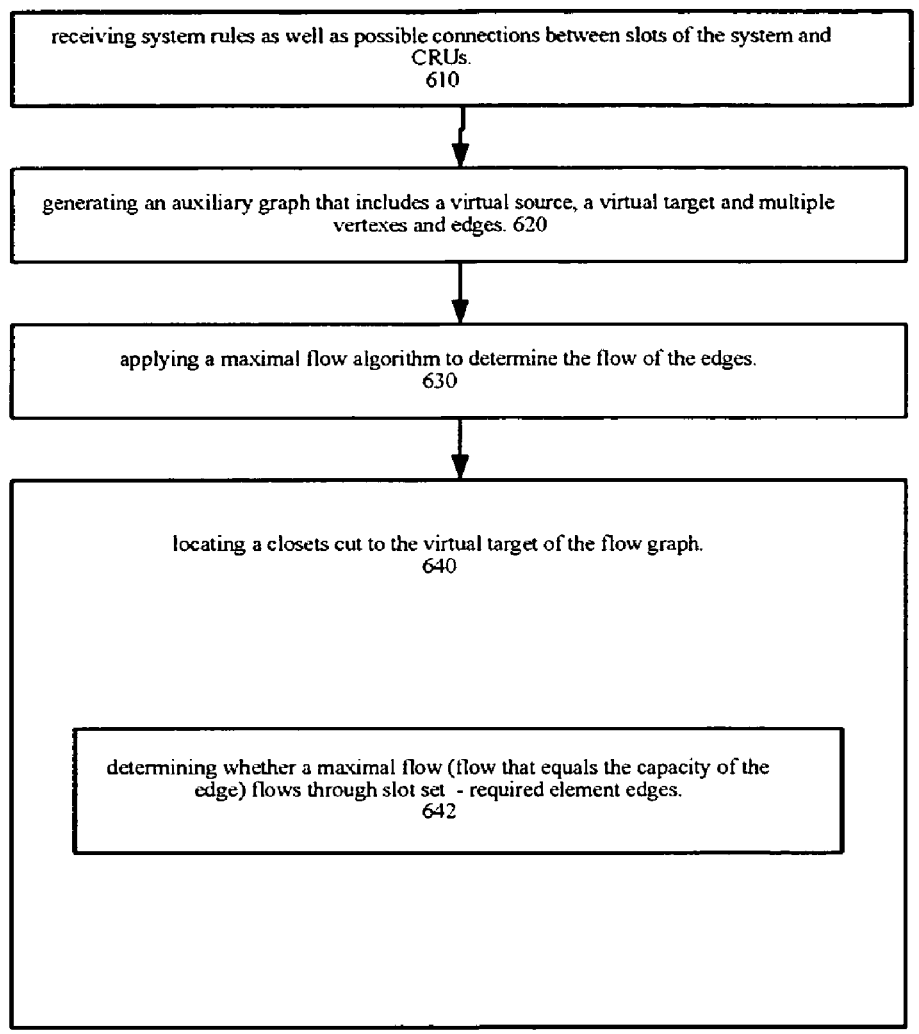
FIG. 6 illustrates a method for evaluating a current system state, according to an embodiment of the invention.

FIG. 6 illustrates a method 600 for evaluating a current system state, according to an embodiment of the invention. Method 600 can correspond to stage 110 of method 100. Thus, method 100 can include the various stages of method 600.

Method 600 starts by stage 610 of receiving system rules as well as possible connections between slots of the system and CRUs. The CRUs can belong to the system, to other systems or be a part of a stock.

Stage 610 is followed by stage 620 of generating an auxiliary graph that includes a virtual source, a virtual target and multiple vertexes and edges. The auxiliary graph represents the system and its edges are characterized by their capacity. Referring to the examples illustrated in previous figures such an auxiliary graph can be auxiliary graph 400'.

Stage 620 is followed by stage 630 of applying a maximal flow algorithm to determine the flow of the edges. Stage 630 includes providing a flow in a flow graph that represents a system, multiple CRUs and the rules imposed on this system. Referring to the examples illustrated in previous figures such a flow graph can be flow graph 400 of FIG. 7.

Conveniently, in order to find the state of the system there is a need to determine which rules are satisfied. This can determine which lattice element represents the current state of the system.

The current state of the system, and especially which rules are fulfilled can be discovered by searching for a cut (especially a minimal cut) of the flow graph that represents the system and optionally some additional CRUs. Conveniently the cut is searched from the virtual target of the graph. It is noted that every required element that is the head of an edge in the cut closer to the target is satisfied.

Method 600 can include stage 640 of locating a closest cut to the virtual target of the flow graph. Stage 640 can include looking for maximal flow edges—edges that their flow equals their capacity starting from the virtual target 402 and going downwards. It is noted that cuts other than the closets cut to the virtual target can be selected. Conveniently, the capacity of a required element—virtual target edge that is connected to a certain required element vertex is larger than the sum of the capacities of set—required element edges that enter that certain required element vertex.

The locations of the edges that are included in the cuts indicate whether the rules are fulfilled or not. If, for example, a cut includes a slot set—required element edge then the rule that is represented by this edge is fulfilled.

For example, referring to flow graph 400, stage 640 includes stage 642 of determining whether a maximal flow (flow that equals the capacity of the edge) flows through slot set—required element edges 521-525. Referring to graph 400 edges 522, 523 and 524 have maximal flow and are in the cut closest to the target, thus all three rules are fulfilled.

More generally, stage 640 can include finding a minimum cut closest to target, its edges in the set (slot—required element), and the CRUs nodes contributing to the maximum flow in those edges of the cut.

According to an embodiment of the invention the method can include repetitively locating in each level of edges maximal flow edges. If this level includes non-maximal flow edges than lower level edges associated with these non-maximal flow edges are examined to fine lower level maximal flow edges. This stage can be repeated until the whole flow graph or at least a predefined portion of the flow graph is scanned.

As mentioned above, an auxiliary flow graph and a corresponding flow graph illustrate a certain scenario. This scenario is characterized by the relationships between slots and none-failed CRUS.

In many cases multiple CRUs can potentially be placed in a single slot. For example, a certain slot can be occupied by a CRU that belongs to the system, a CRU that belongs to a CRU stock, a redundant CRU from another system, a necessary CRU of another system and the like.

According to an embodiment of the invention, each of these options can be represented by a different flow graph. The different flow graphs can be converted to graphs and the cost of each solution can be calculated.

According to another embodiment of the invention the flow graph of the system will be amended to include the different possibilities, for example by introducing virtual vertexes with capacity values that indicate that one CRU out of multiple CRUs should be inserted into a certain slot. By applying maximal flow algorithms with cost constraints the best CRU that should be located in the slot can be found.

Figure 8:
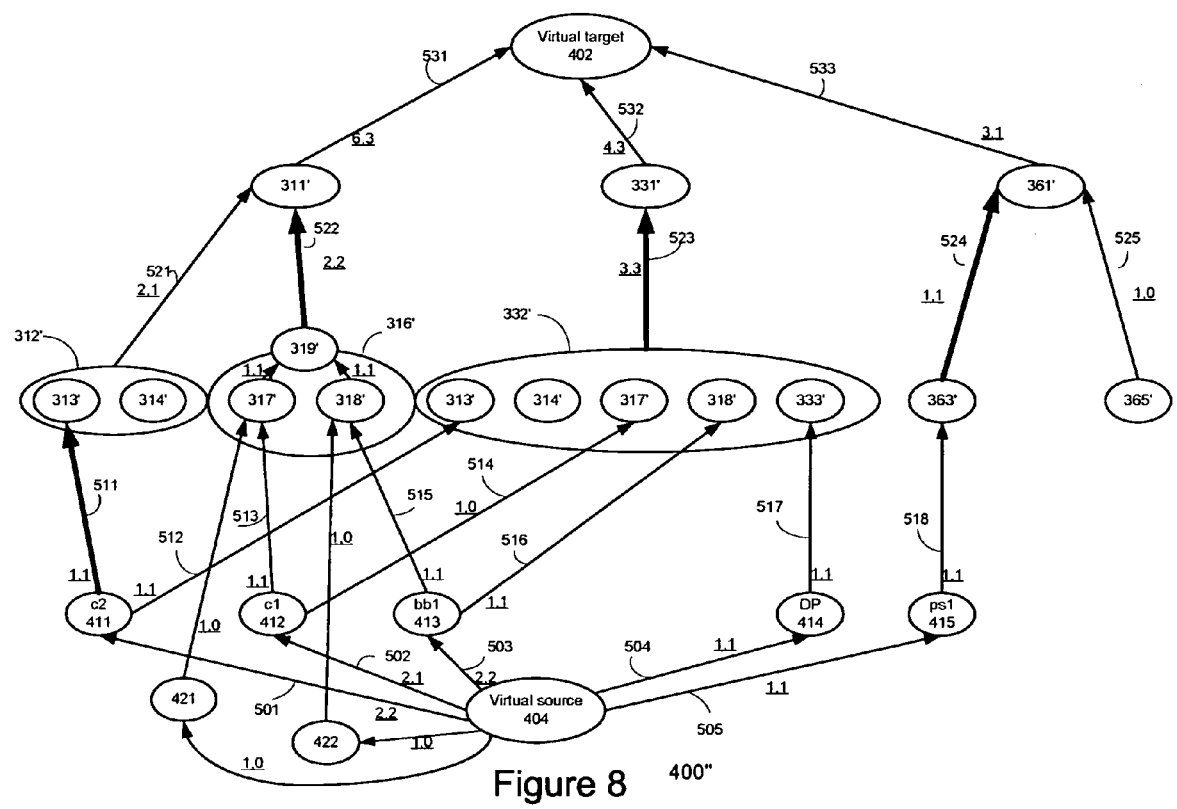

FIG. 8 illustrates flow graph 400" according to an embodiment of the invention. Flow graph 400" includes additional virtual slot vertex 319' and additional CRU vertexes 421 and 422. Flow graph 400" represents exemplary system and in addition two CRUs 421 and 422 that do not belong to that system but can be placed in slots 317 and 318 of the system accordingly. At least one of these additional CRUs can belong to another system while at least one other CRU can be included in a stock of CRUs. Typically, the cost associated with edges that connect these CRUs to slots vertexes reflects the position of these CRUs.

It is assumed that CRUs 412 and 421 can fit into slot 317 while CRUs 413 and 422 can fit into slot 318. Virtual slot vertex 319' is connected to vertexes 317', 318' and 311'.

The capacity of the edges that connect CRUs vertexes 421 and 422 to the virtual source 404, and the capacity of the edges that connect vertexes 317' and 318' to vertex 319' is one.

By applying maximal flow algorithms the optimal CRU that should be chosen can be determined. These algorithms are responsive to the cost of each edge. The flow through a selected CRU is higher than the flow via non-selected CRU. The flow through a non-selected CRU can be zero.

The following description provides a more detailed mathematical explanation of some of the mentioned above methods and graphs.

FIG. 4 that illustrates three exemplary rules 310, 330 and 360, can be viewed as a bi-partite graph $G=(\{R, \hat{S}\}, E, f)$, where the set of nodes R represents the required elements imposed on the system, based on the rules (which can be physical and/or logical configuration rules). The set of nodes $\hat{S}$ is a collection of sets over the slots S in the system. There is an edge $(r, \hat{s}) \in E$, from node $r \in R$ to a set of slots $\hat{s} \in \hat{S}$, if the slot(s) represented by $\hat{s}$ can serve the role described by the required element r. The function $f : E \rightarrow N$ defines weight value for every edge $(r, \hat{s}) \in E$; its meaning is the advantage gained by allocating CRUs to the slots in $\hat{s}$ so that r is satisfied.

A required element is satisfied if there is an internal non-failed CRU (or CRUs) in the slot(s) that fulfills the requirements specified by the required element. This corresponds to an edge $(r, \hat{s}) \in E$ such that some slots in $\hat{s}$ are occupied with non-failed CRUs and all the requirements in r are fulfilled.

Flow graph 400 can be viewed as an extended auxiliary flow graph $G'=(V, A, b)$. It is constructed as follows: (i) the vertices in the graph are $V=\{R, \hat{S}\} \cup \{u, t\} \cup C$, where u, and t are the virtual source and virtual target of the extended auxiliary flow graph, respectively, and C is the set of CRUs. To find the current system state we use only those operative CRUs (from C) that are located in the slots.

The edges in the graph are $A=E' \cup E_1 \cup E_2 \cup E_3$ where: E' includes the slot set—required element edges, $E_1$ includes the required element—virtual target edges, $E_2$ includes the source CRU edges and $E_3$ includes the CUR slot edges.

For every $r \in R$ there is an edge $(r, t) \in E_1$. For every $c \in C$ there is an edge $(u, c) \in E_2$. For every $c \in C$ and every set of slots $\hat{s} \in \hat{S}$ such that there exists a slot $s \in \hat{s}$ and c is in slot s, there is an edge $(c, \hat{s}) \in E_3$.

The capacity of every edge $e \in A$ is defined by b as follows: $b(e)=1$ for every $e \in E_3$. For every $e=(\hat{s}, r) \in E'$, the value of $b(e)$ is defined by the argument of the n-of operator defining $\hat{s}$. Capacity $b(e)$ is a large number for every edge $e \in E_1$; the number is bounded by the sum of the n-of number entering to the corresponding required element vertex plus 1. Capacity $b(e)$ is a large number for every edge $e \in E_2$; the number is bounded by the number of appearances of a slot in the n-of sets and is not larger than the size of $\hat{S}$.

A minimum cut closer to the target should include edges from $E_3$ and E'. We observe the cut closer to the target node t.

It is noted that maximum flow and minimum cut, in our case, is reached in time complexity $O(|E|)$.

In order to determine which CRU should be inserted in which slot there can be a need to check inserting CRUs that do not belong to the system. This can be done in various manners. For example the extended auxiliary flow graph can be amended to include these CRUs. An extended auxiliary flow graph with only external functional CRUS, edges from these CRUs to empty slots that can fit them, and prices on the edges from CRUs nodes, can be used to select the best CRUs assignment for satisfying additional rules.

Conveniently, every $e \in E_3$ has a price value (cost) defined by p as follows: (i) for a non-faulty $c \in C$ and a slot $s \in \hat{s}$ s.t. $e=(c, \hat{s}) \in E_3$, (s can host c). (ii) $p(e)=0$ if CRU c is in slot s and is non-faulty. (iii) $p(e)=1$ if c is a non-failed CRU in stock that can be plugged into s. (iv) $p(e)=2$ if c is a non-failed CRU redundant in other systems that can be plugged into s, and (iv) $p(e)=K$ otherwise (wherein K is a large number greater than twice the number of CRUs).

These above price values can be further modified to include the cost of inserting the selected CRUs. A maximum flow with minimum price algorithm can be used to solve this problem.

According to another embodiment of the invention the optimal CRUs to match slots can be found by the following stages: (i) a first stage in which an extended auxiliary flow graph that includes the edges in E and only the edges of $E_3$ that have a first cost is processed; (ii) a second stage in which an extended auxiliary flow graph that includes only the edges in (i) and those that have a second cost is processed; (iii) a third stage in which an extended auxiliary flow graph that includes only the edges in (ii) and those that have a cost that exceeds the first and second costs is processed.

Another variation of the extended auxiliary flow graph can be used to investigate the fulfillment of redundant rules. Such an extended auxiliary flow graph may include only vertexes from R that represent redundant rules.

According to another embodiment of the invention the system states are responsive not just to a compliance with rules but also to the functionality of objects within the system. Thus, a distinction is made between a state in which certain rules are satisfied and CRUs are functional and another state in which these certain rules are satisfied but one or more CRU is faulty. The state of the CRU is reflected in the graph.

According to a further embodiment of the invention a distinction is made between redundant rules and necessary rules. A similar distinction can be made between necessary CRUs and redundant CRUs.

The following example illustrates how these distinctions affect the graphs that represent the system.

It is assumed that the system can be in one out of four state groups: (i) A perfect system state in which each rule is satisfied and all the CRU of the system are functional. (ii) Good system states in which all the rules are satisfied but at least one internal CRU failed. (iii) Working system states in which all necessary rules are satisfied but at least one redundant rule is not satisfied. (iv) Non-operable system states in which at least one necessary rule is not satisfied.

In view of these definitions the set of required elements R and the set of slots S are partitioned as follows: $R=R_n \cup R_r$, $R_n \cap R_r = \phi$, and $S = S_e \cup S_i$, and $S_e \cap S_i = \phi$ where: (i) the set of nodes $R_n$ represents all the required elements that are necessary, (ii) the set of nodes $R_r$ represents all the required elements that support redundancy in the system, (iii) the set $S_i$ represents occupied slots, (iv) the set $S_e$ represents empty slots; they may have association with CRUs in the stock or in other systems.

Set $S_i$ is further partitioned to slots that are faulty (e.g., broken, host failed CRU), $S_{if}$, and those that are not failed (operative), $S_{io}$. F denotes the number of required elements in necessary rules, $F=|R_n|$, and H denotes the number of required elements in redundant rules, $H=|R_r|$.

A necessary allocation $M_F$ includes all the necessary required elements. $M_F = \{r | r \in R_n\}$. A redundant allocation $M_H$ includes all the required elements that are redundant; $M_H = \{r | r \in R_r\}$.

The status of a system is formally defined based on allocations in the requirement relation graph as follows:

The state of the system is perfect if there exists an allocation M, size(M)=F+H, and $S_{if} = \phi$. The state of a system is good if there exists an allocation M with size(M)=F+H, and $S_{if} \neq \phi$. The state of a system is working if there is an allocation $M = M_F \cup M_H$, where size(M)<F+H and size($M_F$)=F. The state of the system is non-operable if for every allocation M, size(M)<F.

The system state is evaluated by examining an extended auxiliary flow graph that reflects all the rules and all necessary elements. If the allocation size is less than F+H (first condition of a working system), another extended auxiliary flow graph is examined. This graph includes only the necessary rules ($R_n$).

An allocation can be updated in response to a change in the state of CRUs or slots.

Failure of a CRU in a slot member in $S_{io}$ causes the slot object to move into the internal failed set $S_{if}$ until the CRU is removed, at which point it is moved into the external set $S_e$.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, the computer program product includes a computer useable medium including a computer readable program, wherein the computer readable program when executed on a computer causes the computer to execute at least one stages of at least one method out of methods 100, 400 and 600.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A computer implemented method for support of maintaining a computer system, the method comprising:
   evaluating a current system state and detecting a first lattice element corresponding to the current system state;
   locating at least one state improvement path within a lattice that represents states of the computer system, between the first lattice element and a second lattice element representative of a target system state;
   wherein an order of lattice elements in the lattice corresponds to a quality of states represented by the lattice elements,
   determining, for at least one state improvement path, rules that should be satisfied in order to reach the system target state; and determining how to fulfill the rules associated with at least one state improvement path;

wherein at least one rule that should be satisfied in order to reach the system target state that creates a physical configuration of hardware objects in the computer system.

2. The method according to claim 1 wherein the evaluating comprises applying at least one flow algorithm on a flow graph representative of the computer system and rules imposed on the computer system.

3. The method according to claim 2 wherein the evaluating comprises defining capacities of edges of the flow graph in response to the rules, determining a flow through the edges by applying a flow algorithm; wherein a flow that passes through at least some edges of the flow graph correspond to a connection between a replaceable hardware object and a slot.

4. The method according to claim 1 wherein the evaluating comprises applying at least one flow algorithm on a flow graph representative of the computer system, of rules imposed on the computer system and of replaceable hardware objects that do not belong to the system.

5. The method according to claim 1 wherein the method comprises selecting system slots and replaceable hardware objects that can be inserted in the slots in response to rules and in response to characteristics of slots and replaceable objects.

6. The method according to claim 1 wherein the determining how to fulfill the rules comprises selecting at least one replaceable hardware object that does not belong to the computer system.

7. The method according to claim 1 wherein the determining how to fulfill the rules comprises selecting at least one replaceable hardware object that belongs to another system.

8. The method according to claim 1 further comprising performing at least one operation so as to satisfy the rules.

9. The method according to claim 1 wherein the evaluating current system state comprises: receiving system rules as well as possible connections between slots of the computer system and replaceable hardware objects;

generating an auxiliary graph that includes multiple vertexes and edges;

wherein the multiple vertexes represent slots of the computer system and replaceable hardware objects that can be inserted to the slots and required elements;

wherein the edges of the auxiliary graph are characterized by their capacity;

applying a maximal flow algorithm to determine the flow in the edges; and providing a flow graph representative of the computer system, multiple replaceable hardware objects and rules imposed on the computer system.

10. The method according to claim 9 further comprising locating a cut in the flow graph.

11. The method according to claim 10 wherein the edges of the flow graph are arranged in multiple levels and wherein the locating a cut comprises locating in a certain level of edges maximal flow edges; if the certain level comprises non-maximal flow edges than examining lower level edges associated with these non-maximal flow edges in order to find lower level maximal flow edges.

12. The method according to claim 9 further comprising locating a closest minimal cut to a virtual target of the flow graph.

13. The method according to claim 9 whereas the generating of an auxiliary graph is responsive to a possible selection between multiple replaceable hardware objects that can be inserted into a certain slot.

14. The method according to claim 9 further comprising associating cost to at least some edges and generating a flow graph in response to the cost.

* * * * *